Patented Oct. 26, 1926.

1,604,308

UNITED STATES PATENT OFFICE.

HENRY L. PRESTHOLDT, OF MINNEAPOLIS, MINNESOTA.

CASEIN GLUE.

No Drawing.  Application filed April 17, 1922. Serial No. 554,194.

My present invention provides a new composition of matter, herein designated as "casein glue", but which, from its broader aspect, is an adhesive composition adapted to be used, by itself or commingled with other substances, as an adhesive coating.

In this improved adhesive composition, casein is used as the adhesive base and is commingled with calcium hydroxide, tri-sodium phosphate, sodium sulphite and sodium hydroxide.

Sodium sulphite, in addition to being a solvent for casein itself, has the additional function of increasing the number of colloids and reducing the hardness of the set glue so that the set glue will not damage knives or tools. Sodium hydroxide is a solvent which makes it possible to utilize a considerable quantity of buttermilk casein, which latter sells on the market at a much less price than lactic acid casein.

I have obtained a highly efficient glue or adhesive by the use of the above noted substances in accordance with the following formula:

|  | Parts. |
|---|---|
| Casein | 50 to 75 |
| Calcium hydroxide | 6 to 20 |
| Tri-sodium phosphate | 4 to 12 |
| Sodium sulphite | 3 to 8 |
| Sodium hydroxide | 2 to 10 |

The above noted substances are commingled in dry powdered form and the composition will be sold in this dry powdered form. When the composition is to be used, it will be introduced into water to form an emulsion and it is then, of course, that the chemical reactions that develop the adhesive qualities of the composition, will take place. After these chemical reactions have taken place, the emulsion is adapted to be used as a glue or as a coating or to be commingled with other substances such as paint or calcimine, which contain certain color pigments. When desired, however, the color-producing pigments may be commingled with the dry composition. When the composition is to be used simply as a glue, no additions to the formula above given, except water, will be required.

Casein provides the colloids upon which the glue depends for its adhesive qualities. The calcium hydroxide in solution with casein forms a calcium caseinate, which is insoluble in water and provides the glue mixture with waterproof qualities. Tri-sodium phosphate is a casein solvent. Sodium hydroxide is a casein solvent. These two in combination with sodium sulphite impart the peculiar property of the glue mixture known as the "penetrating" quality. Sodium sulphite in solution in the glue mixture penetrates the wood, forming what is known as "sulphite of cellulose". These three salts, tri-sodium phosphate, sodium sulphite, sodium hydroxide, in combination, give the glue solution a long liquid life, without deterioration in adhesive strength.

What I claim is:

An adhesive composition made in accordance with the following formula:

|  | Parts. |
|---|---|
| Casein | 50 to 75 |
| Calcium hydroxide | 6 to 20 |
| Tri-sodium phosphate | 4 to 12 |
| Sodium sulphite | 3 to 8 |
| Sodium hydroxide | 2 to 10 |

In testimony whereof I affix my signature.

HENRY L. PRESTHOLDT.